(12) United States Patent
Kwoka

(10) Patent No.: US 6,182,810 B1
(45) Date of Patent: Feb. 6, 2001

(54) DIFFERENTIAL-SPEED-DEPENDENT COUPLING

(75) Inventor: Georg Kwoka, Much (DE)

(73) Assignee: GKN Viscodrive GmbH, Lohmar (DE)

( * ) Notice: Under 35 U.S.C. 154(b), the term of this patent shall be extended for 0 days.

(21) Appl. No.: 08/989,530

(22) Filed: Dec. 12, 1997

(30) Foreign Application Priority Data

Dec. 20, 1996 (DE) .............................. 196 53 310

(51) Int. Cl.[7] .................................................. F16D 35/00
(52) U.S. Cl. ...................... 192/58.42; 192/58.43; 192/85 AA; 192/103 F
(58) Field of Search .................. 192/57, 58.4, 58.42, 192/103 F, 85 A, 85 AA, 58.43; 188/322.5; 16/51, 58

(56) References Cited

U.S. PATENT DOCUMENTS

| 3,166,167 | * | 1/1965 | Kinsman | 192/85 A X |
|---|---|---|---|---|
| 3,495,475 | * | 2/1970 | Rumsey | 188/322.5 X |
| 3,910,391 | * | 10/1975 | Detty et al. | 192/58.4 |
| 4,058,027 | | 11/1977 | Webb. | |
| 4,317,510 | * | 3/1982 | Staub | 192/57 X |
| 4,938,322 | * | 7/1990 | Sugasawara et al. | 192/58.42 X |
| 5,007,885 | * | 4/1991 | Yamamoto et al. | 192/103 F X |
| 5,526,912 | * | 6/1996 | Gassmann | 192/57 |
| 5,562,191 | * | 10/1996 | Gassmann | 192/58.42 |
| 5,632,185 | * | 5/1997 | Gassmann | 192/103 F X |

FOREIGN PATENT DOCUMENTS

| 4327519 | 2/1995 | (DE). |
|---|---|---|
| 4343307 | 6/1995 | (DE). |
| 4424255 | 1/1996 | (DE). |
| 4444027 | 6/1996 | (DE). |
| 2281109 | 2/1995 | (GB). |
| 2309497 | 7/1997 | (GB). |
| 2313169 | 11/1997 | (GB). |

* cited by examiner

Primary Examiner—Rodney H. Bonck
(74) Attorney, Agent, or Firm—Francis N. Carten

(57) ABSTRACT

An automatic coupling has two parts supported inside one another, and which are rotatable around a common longitudinal axis. The parts form an annular chamber. An annular piston axially divides the annular chamber into two compartments. The annular piston is connected to one of the parts in a rotationally fast and axially movable way and there is formed a shear channel which extends helically relative to the longitudinal axis. The shear channel connects the two compartments separated by the annular piston to one another. The end faces of the annular chamber are formed by the other one of the parts, with the annular piston being able to support itself on the end faces of the annular chamber while generating braking forces.

12 Claims, 4 Drawing Sheets

DIFFERENTIAL-SPEED-DEPENDENT COUPLING

BACKGROUND OF THE INVENTION

The invention relates to an automatic coupling comprising two parts which are supported inside one another, which are rotatable around a common longitudinal axis and which form an annular chamber filled with a highly viscous fluid, for the purpose of generating a locking effect between the two parts when the two parts rotate relative to one another. In referring herein to a "locking" effect between the two parts, it is to be appreciated that in practice the effect is one of an inhibition or braking of relative rotation between the parts rather than a complete prevention of relative rotation, and the term "locking" is to be interpreted accordingly.

Couplings of this type are known as viscous couplings and described in GB 1 357 106. These couplings are used in combination with differential drives or on their own in the drivelines of motor vehicles. In the former application they generate a differential-speed-dependent locking effect at the axle differentials or in central differentials. In the latter application they serve as so-called visco-transmissions which have the function of a differential-speed-dependent engageable coupling for the second driving axle which is normally the rear axle of motor vehicle with a permanent front wheel drive.

Furthermore, a coupling of this type is known from DE 37 25 103 C1 wherein the coupling plates of a viscous coupling operate in a highly viscous fluid and wherein a conveying worm also operating in the highly viscous fluid is intended to reduce the locking effect as a function of the fluid level in the region of the coupling plates in the case of a relative rotation.

Furthermore, DE 37 43 434 C2 describes a friction coupling operated by a pressure agent, which is combined with a viscous coupling, with the latter being included in the power flow between a housing and a hub when the friction coupling is loaded, whereas the parts rotate freely relative to one another when the friction coupling is not loaded.

Finally, P 43 43 307.3 proposes a Visco-Lok coupling wherein a highly viscous fluid in a chamber—as a result of shear processes in the highly viscous fluid—increases the pressure in such a way that there is displaced a piston which delimits the chamber and which loads a conventional multi-plate friction coupling in the sense of closing same.

SUMMARY OF THE INVENTION

It is the object of the present invention to provide a coupling of the initially mentioned type which, in the form of a viscous coupling, even at a small speed differential and after an extremely short reaction time, contributes towards building up a known locking effect and which, at a greater speed differential and thus with increased traction requirements, generates a greater locking effect.

The objective is achieved in that, in the annular chamber, there is arranged an annular piston which divides the annular chamber into two compartments and which, in the annular chamber, is connected to one of the parts in a rotationally fast and axially displaceable way by means of driving elements; and which, by means of a cylindrical outer face, closely fits into a cylindrical counter face of the other one of the parts; and that between the outer face and the counter face there is provided at least one shear channel which extends helically relative to the longitudinal axis and which connects the two compartments to one another, which compartments are separated by the annular piston; and that end faces of the annular chamber are formed by the other one of the parts and that the annular piston, by means of end faces, is able to support itself at least indirectly at the end faces of the annular chamber for the purpose of generating braking forces.

This coupling embodiment shows that when the annular piston is in a centered position, the coupling, in respect of design and function, corresponds to a viscous coupling and that if the annular piston is in a position of support in one compartment, the coupling becomes a friction coupling whereas, in the other compartment, it continues to operate as a viscous coupling with changed characteristics, with the effect of both couplings being added up.

In consequence, there are obtained three major characteristic curve portions which are advantageously adapted to and cover three operating conditions as follows:

small speed differential, determined entirely by the characteristics of a viscous coupling, initially with a low locking moment: suitable for tight cornering; avoids wind-up in the driveline.

higher speed differential, determined entirely by the characteristics of a viscous coupling, with higher, moderately increasing locking moment; suitable for normal driving conditions; no negative influence on vehicle handling.

high speed differential, largely determined by the characteristics of a friction coupling; progressively increasing locking moment as a starting aid in the case of wheel spin.

If there exists a relative speed between the two parts rotatable relative to one another, fluid shear takes place in the shear channel, as a result of which the fluid is conveyed from the one compartment into the other compartment, with the piston being axially displaced in the annular chamber.

If the annular piston is in a centered position in the annular chamber, the coupling has the locking effect and the advantageous vibration damping effect of a viscous coupling. In the case of a predetermined higher speed differential, the coupling additionally acts as a mechanical friction coupling. It is particularly advantageous that between the housing and hub there are provided only rotating seals and not also axially displaceable seals.

According to a preferred embodiment it is proposed that between the annular piston and one of the parts, there are arranged axially effective spring means which axially center the annular piston in the annular chamber and which, with a reproducible reaction time, do not allow the coupling to operate as a friction coupling until there exists a higher predetermined speed differential.

In this way it is ensured that the reaction behavior in both directions of relative rotation is always the same due to the annular piston being centered, and that it is not influenced by previous locking processes. When the annular piston is centered, pressure compensation takes place through the helical shear channel.

When eliminating such spring means, a similar effect can be achieved by a plurality of shear channels with a steep gradient in respect of the circumferential direction. In this case it is necessary to provide a higher speed differential to build up a piston pressure sufficient for closing the friction coupling.

According to a first embodiment it is proposed that the end faces of the annular piston and/or the end faces of the annular chamber are provided with friction linings and are able to contact one another directly. According to a further embodiment it is proposed that between the end faces of the annular piston and the end faces of the annular chamber, there are arranged sets of inner plates and outer plates which, in a rotationally fast and axially movable way, are alternately connected to the one and the other of the parts rotatable relative to one another, and which are able to contact one another directly.

By designing the friction linings in the two compartments in different ways or by providing different numbers of coupling plates in the two compartments, it is possible to achieve different characteristics as a function of the direction of relative rotation between the housing and the hub.

According to a preferred embodiment, the inner or outer plates directly contacting the end faces of the annular piston are connected in a rotationally fast way to the same one of the rotatable parts as is the annular piston. Any wear at the annular faces of the annular piston is thus avoided. According to a further embodiment it is proposed that the driving elements consist of longitudinal teeth at the one of the rotatable parts and of counter teeth at the annular piston, which teeth engage one another with a clearance fit. This measure ensures that there is neither friction nor wear between the cylindrical outer face of the annular piston and the cylindrical counter face of the housing. This means that the piston and possibly also the component providing the counter face can be made of plastics.

According to a preferred embodiment, it is proposed that the driving elements consist of longitudinal teeth at the one of the rotatable parts and of counter teeth at the annular piston, which teeth engage one another with a clearance fit. In this embodiment, the longitudinal teeth can simultaneously cooperate with counter teeth at the inner plates, whereas corresponding longitudinal teeth at the cylindrical part of the other one of the rotatable parts can cooperate with counter teeth at the outer plates.

To ensure that the seals have a small diameter, it is preferably proposed that a hub forms one of the rotatable parts to which the annular piston is connected and that a barrel-shaped housing forms the other one of the rotatable parts which forms the end faces of the annual chamber.

According to a first further embodiment, the shear channel extending helically relative to the longitudinal axis is provided in the form of a groove in the annular piston. According to a second further embodiment, the shear channel extending helically relative to the longitudinal axis is provided in the form of a groove in the inner face of the housing. In this respect it is particularly advantageous if the counter face at the other one of the rotatable parts, i.e. especially at the housing, is provided in a separately inserted sleeve. In this way it is possible to keep the basic components unchanged while being able to provide different groove shapes in respect of width, depth and gradient, simply by exchanging the sleeve.

According to a preferred embodiment, it is proposed that in the annular piston, there is provided at least one compensating chamber which is closed by a displaceable compensating piston. Such compensating chambers are necessary because of the temperature-related viscosity of the fluid and the need for the two compartments to be filled 100%. The compensating chamber which, in principle, can also be accommodated in housing parts is filled with a gaseous medium which, at ambient temperature, can also comprise negative pressure relative to the atmospheric pressure. In this embodiment, supporting springs for the compensating piston are to be provided.

The characteristics of the coupling in the first and second operating range are determined by the viscosity of the fluid used and the number and size of the coupling plates. The transition from the viscous coupling characteristics to combined viscous coupling and friction coupling characteristics is determined by the number of shear channels and the gradient of the at least one shear channel, especially when cooperating with the spring means for the purpose of centering the annular piston. The characteristics of the coupling in the third operating range, finally, are determined by the influencing factors already mentioned and also by the friction plates, the friction linings, the coupling plates and the characteristics of the compensating chambers.

BRIEF DESCRIPTION OF THE DRAWINGS

Preferred embodiments of the invention are illustrated in the drawings and explained in greater detail below.

DETAILED DESCRIPTION OF THE PREFERRED EMBODIMENT

Figure 1:
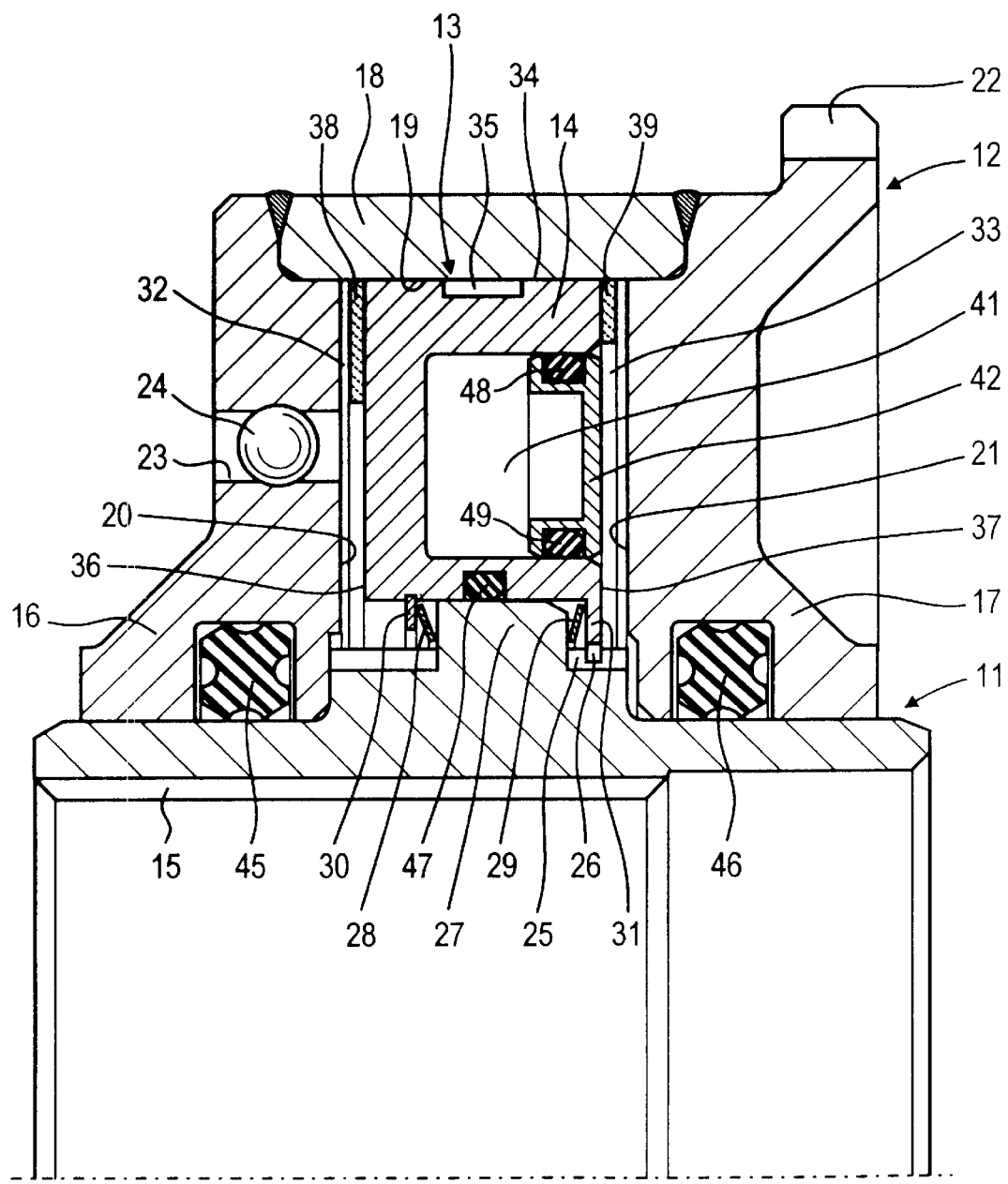
FIG. 1 is half a longitudinal section through an inventive device having a piston which acts directly on end walls of the chamber.

FIG. 1 shows a device which, substantially, consists of a hub 11 and a barrel-shaped housing 12, which two parts, together, form an annular chamber 13 accommodating an annular piston 14. The hub 11 comprises a set of inner teeth 15 for establishing a connection with a shaft and forms the first of two parts which are rotatable relative to one another. The housing part 12 is welded together out of two cover parts 16, 17 and a cylindrical liner 18 and forms the second of two parts which are rotatable relative to one another. The cover parts 16, 17 form inner end faces 20, 21 of the annular chamber 13 and the cylindrical liner 18, on its inside, forms a cylindrical counter face 19 for the annular piston 14. The cover part 17 is provided with a set of circumferential teeth 22 for driving the other one of the two parts 12 rotatable relative to one another. In the cover part 16 there is formed a bore 23 which is closed by a ball 24 and serves to fill the annular chamber with a highly viscous fluid. The hub 11, furthermore, comprises a set of outer teeth 25 which, in a rotationally fast and longitudinally displaceable way, cooperates with the inner teeth 26 of the annular piston 14. The hub 11 also comprises a collar 27 on which there are supported plate springs 28, 29 which axially center the annular piston 14 in the annular chamber 13. The annular piston 14 is provided with a securing ring 30 and an inner flange 31 which serve as holding means for the plate springs 28, 29, with the inner teeth 26 being formed on to the inner flange 31.

The annular piston 14 divides the annular chamber 13 into two compartments 32, 33 which communicate with one another entirely by means of a spiral-shaped groove 35 which is provided in the cylindrical outer face 34 of the annular piston 34 and which, from the outside, is closed by the cylindrical counter face 19. The radial end faces 36, 37 of the piston 14 are covered by friction linings 38, 39 with different annular surfaces. In the annular piston 14 there is provided a compensating chamber 41 which is sealed by means of an axially displaceable compensating piston 42.

The two rotatable parts 11, 12 are sealed relative to one another by annular seals 45, 46, with the annular piston 14 being sealed relative to the collar 27 by means of a seal 47. Finally, the compensating piston 42 is provided with annular seals 48, 49 for having a sealing effect relative to the annular piston 14.

If the first and second rotatable parts 11, 12 rotate at the same speed, the annular piston 14 is axially centered within the annular chamber 13. Due to the effect of the plate springs 28, 29, pressure compensation can take place between the compartments 32, 33 through the groove 35. When the two parts 11, 12 rotate relative to one another, the fluid shears inside the compartments 32, 33 between the respective end faces, as in a standard viscous coupling. Furthermore, fluid is conveyed in the groove 35, which is due to the fluid shear between the faces of the groove base and the closing inner wall of the annular chamber 13, which groove base faces and inner wall move relative to one another. A pressure increase in one of the compartments 32, 33, which is sufficient to overcome the spring forces of the springs in the other one of the compartments leads to an axial displacement of the annular piston 14 towards the lower pressure until the respective friction lining 38 or 39 in the compartment with the reduced pressure contacts the respective end face 20 or 21, so that the solid member friction between the parts rotatable relative to one another, which is aimed at, is effected in the same way as in a friction coupling. With an increasing relative speed and thus an increasing pressure in one of the compartments, the respective fluid shear in this compartment is also intensified.

Figure 2:
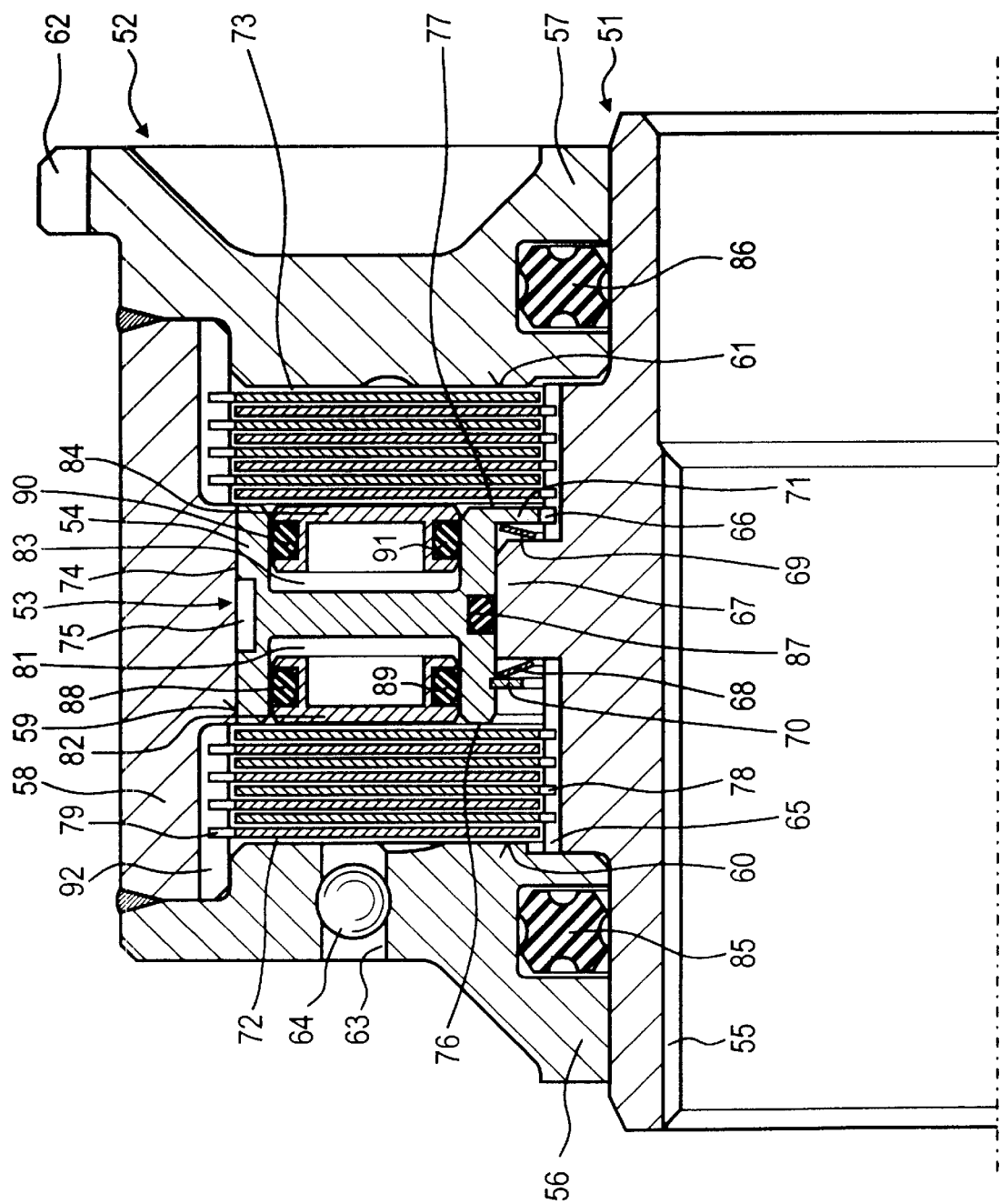
FIG. 2 is half a longitudinal section through an inventive device having a piston which acts indirectly by means of friction plates on end walls of the chamber in a first embodiment.
Figure 3:
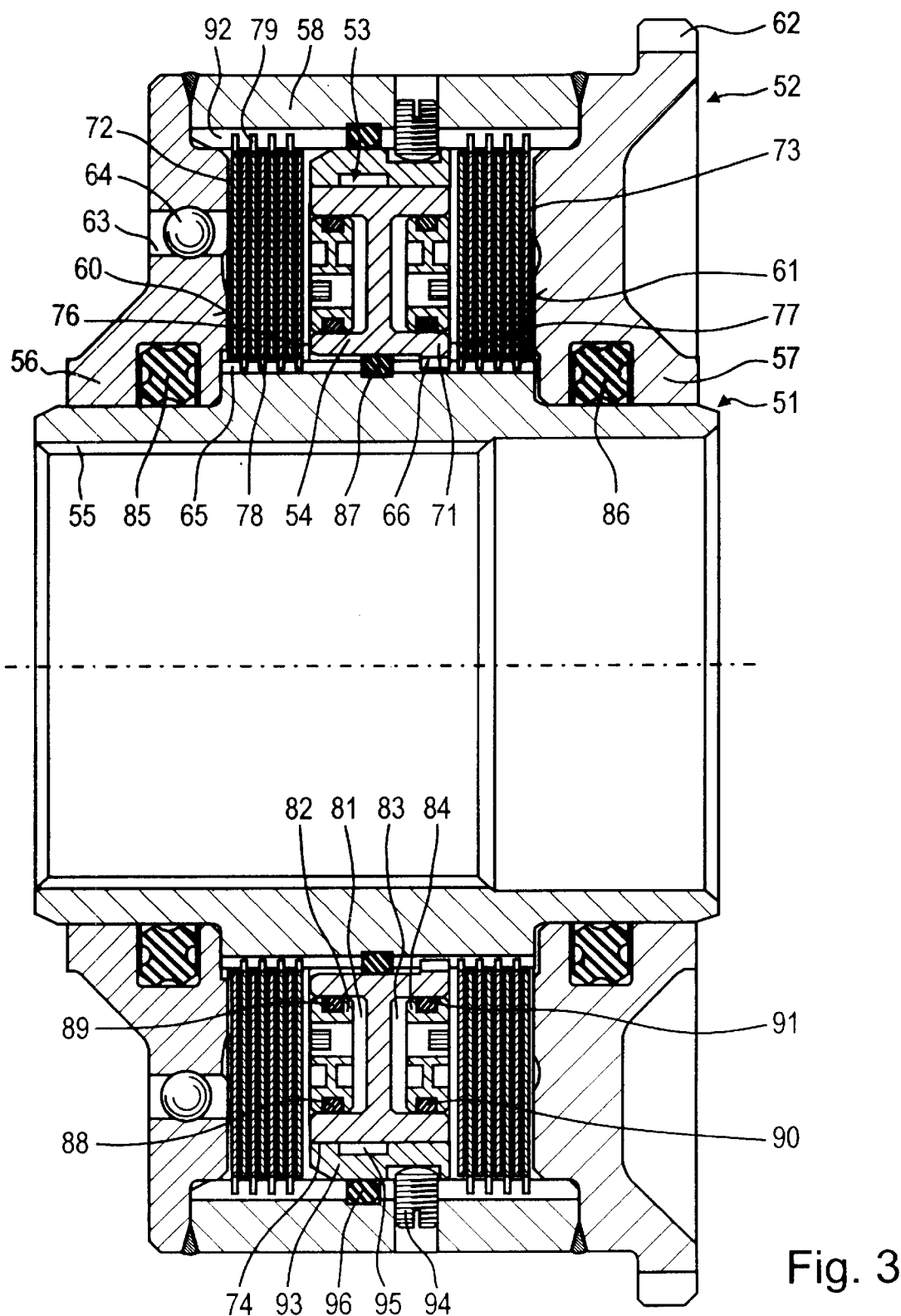
FIG. 3 is half a longitudinal section through an inventive device having a piston which acts indirectly by means of friction plates on end walls of the chamber in a second embodiment.

FIGS. 2 and 3 each show a device which, substantially, consists of a hub 51 and a barrel-shaped housing 52, which two parts, together, form an annular chamber 53 accommodating an annular piston 54. The hub 51 comprises a set of inner teeth 55 for establishing a connection with a shaft and form the first of two parts which are rotatable relative to one another. The housing part 52 is welded together out of two cover parts 56, 57 and a cylindrical liner 58 and forms the second of two parts which are rotatable relative to one another. The cover parts 56, 57 form inner end faces 60, 61 of the annular chamber 53 and the cylindrical liner 58, on its inside, forms a cylindrical counter face 59 for the annular piston 54. The cover part 57 is provided with a set of circumferential teeth 62 for driving the other one of the two parts 52 rotatable relative to one another.

In the cover part 56, there is formed a bore 63 which is closed by a ball 64 and serves to fill the annular chamber with a highly viscous fluid. The hub 51, furthermore, comprises a set of outer teeth 65 which, in a rotationally fast and longitudinally displaceable way, cooperates with the inner teeth 66 of the annular piston 54.

In the embodiment according to FIG. 2, the hub 51 comprises a collar 67 on which there are supported plate springs 68, 69 which axially center the annular piston 54 in the annular chamber 53. The annular piston 54 is provided with a securing ring 70 and an inner flange 71 which serve as holding means for the plate springs 68, 69, with the inner teeth being formed on to the inner flange 71.

The annular piston 54 divides the annular chamber 53 into two compartments 72, 73 which communicate with one another entirely by means of a spiral-shaped groove 75 which is provided in the cylindrical outer face 74 of the annular piston 54 and which, on the outside, is closed by the cylindrical counter face 59.

Between the radial end faces 76, 77 of the piston 54 and the inner end faces 60, 61, there are provided inner plates 78 and outer plates 79 which are alternately arranged in the two compartments 72, 73. The inner plates are secured to the outer teeth 65 in a rotationally fast and axially displaceable way, with the outer teeth 65 being interrupted by the collar 67. The outer plates 79 are secured in inner teeth 90 in the cylindrical liner 58 in a rotationally fast and axially displaceable way, with the inner teeth 92 being interrupted by the cylindrical counter face 59. In the annular piston 54 there is provided a compensating chamber 81 pointing towards the compartment 72 and sealed by an axially displaceable compensating piston 82, and a compensating chamber 83 pointing towards the compartment 73 and sealed by an axially displaceable compensating piston 84. The two rotatable parts 51, 52 are sealed relative to one another by annular seals 85, 86. Furthermore, the annular piston 54 is sealed relative to the collar 67 by a seal 87. Finally, the compensating piston 82 is provided with annular seals 88, 89 and the compensating piston 84 with annular seals 90, 91, in both cases for the purpose of providing a sealing effect relative to the annular piston 54.

If the first and the second of the rotatable parts 51, 52 rotate at the same speed, the annular piston 54 is axially centered within the annular chamber 53. Due to the effect of the plate springs 68, 69, pressure compensation can take place between the compartments 72, 73 through the groove 75. When the two parts 51, 52 rotate relative to one another, the fluid shears inside the compartments 72, 73 between the respective plates, as in a standard viscous coupling. Furthermore, fluid is conveyed in the groove 75, which is due to the fluid shear between the faces of the groove base and the closing inner wall of the annular chamber 53, which groove base faces and inner end wall move relative to one another. A pressure increase in one of the compartments 72, 73, which is sufficient to overcome the spring forces of the springs in the other one of the compartments leads to an axial displacement of the annular piston 54 towards the lower pressure until the respective inner plates 78 and outer plates 79 in the compartment with the reduced pressure contact one another and the respective end faces, so that the solid member friction between the parts rotatable relative to one another, which is aimed at, is effected in the same way as in a friction coupling. With an increasing relative speed and thus in increasing pressure in the other one of the compartments 72, 73, the degree of fluid shear also increases in said compartment in which the plates are axially spaced.

In the embodiment according to FIG. 3, the annular piston 54 in the annular chamber 53 is designed so as to float freely. A sleeve 93 secured by bolts 94 in the cylindrical liner 58 is inserted into the housing 52.

The annular piston 54 divides the annular chamber 53 into two compartments 72, 73 which communicate with one another through a spiral-shaped groove 95 in the sleeve 93, which groove 95, on its inside, is sealed by the cylindrical outer surface of the annular piston 54. Between the radial end faces 76, 77 of the piston and the end faces 60, 61 of the annular chamber, there are provided inner plates 78 and outer plates 79 which are arranged alternately in the two compartments 72, 73. The inner plates are secured to the outer teeth 65 of the hub 51 in a rotationally fast and axially movable way, with the outer plates 79 being secured in inner teeth 92 in the cylindrical liner 58 in a rotationally fast and axially movable way. In the annular piston 54 there is provided a compensating chamber 81 pointing towards the compartment 72 and sealed by an axially displaceable compensating piston 82, and a compensating chamber 83 pointing to the compartment 73 and sealed by an axially displaceable compensating piston 84. The two rotatable parts 51, 52 are sealed relative to one another by seals 85, 86. The annular piston 54 is sealed relative to the hub 51 by a seal 87, with the sleeve 93 being sealed relative to the cylindrical liner 58 by a seal 96. Finally, the compensating piston 82 is provided with annular seals 88, 89 and the compensating piston 84 with annular seals 90, 91, in both cases for the purpose of providing a sealing effect relative to the annular piston 54. If the first and the second of the rotatable parts 51, 52 rotate at the same speed, the annular piston 54 is axially centered in the annular chamber 53, which is due to the symmetric arrangement of the plates and the open connection between the compartments 72, 73. If the two rotatable parts 51, 52, rotate relative to one another, the fluid shears inside the compartments 72, 73 between the respective plates, as in the case of a standard viscous coupling. Furthermore, fluid is conveyed in the groove 95, which is due to the fluid shear between the faces of the groove base and the closing wall of the annular piston 54, which groove base faces and wall move relative to one another. A pressure increase in one of the compartments 72, 73 leads to an axial displacement of the annular piston 54 towards the lower pressure until the respective inner plates 78 and outer plates 79 in the compartment with reduced pressure contact one another and the respective end faces, so that the solid member friction between the parts rotatable relative to one another, which is aimed at, is effected in the same way as in a friction coupling. With an increasing relative speed and thus an increasing pressure in the other one of the compartments, the degree of fluid shear also increases in said compartment in which the plates are axially spaced.

Figure 4:
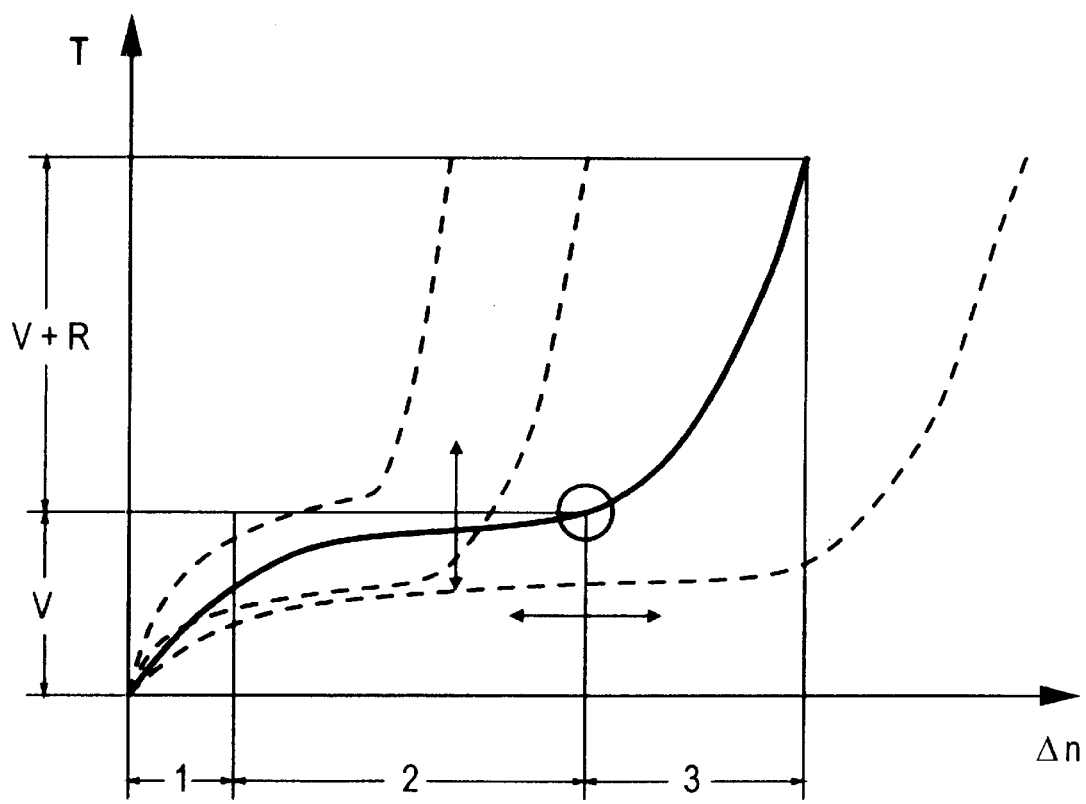
FIG. 4 shows the characteristic curve of an inventive coupling with a locking moment T as a function of the speed differential $\Delta n$.

FIG. 4 is a qualitative illustration of the characteristic curve of an inventive coupling for the locking moment (T) as a function of the speed differential (Δn). Three different differential speed ranges are marked, with ranges 1 and 2 being characterized by the function of a viscous coupling (V) and range 3 by the additional function of a friction coupling (V+R). The transition between 2 and 3 is marked by a circle. Range 1 is intended for tight cornering with a low locking moment at low differential speeds and range 2 for standard operating conditions which a locking effect acceptable for handling; range 3 is intended for increased speed range, and traction requirements with a progressively increasing locking effect at high differential speeds. As indicated by a pair of vertical arrows, the function of the viscous coupling can be varied by the number of plates for example. As indicated by a pair of horizontal arrows, the function of the friction coupling can be varied by the spring stiffness for example. Several curves in dashed lines constitute examples.

Preferred embodiments have been disclosed. The claims should be studied to determine the true scope and content of this invention.

I claim:

1. An automatic coupling comprising:
    two parts supported one inside the other, said two parts rotatable around a common longitudinal axis and which form an annular chamber filled with a highly viscous fluid, for the purpose of generating a locking effect between the two parts when said two parts rotate relative to one another; wherein,
    said annular chamber has an annular piston which divides said annular chamber into two compartments and which, in said annular chamber is connected to one of said parts in a rotationally fast and axially displaceable way by means of driving elements, and which, by means of a cylindrical outer face closely fits into a cylindrical counter face of the other one of said parts and wherein between said outer face and said counter face there is provided at least one shear channel which extends helically relative to said longitudinal axis and which connects said two compartments to one another; and wherein end faces of said annular chamber are formed by the other one of the parts and said annular piston by means of end faces is able to engage at least indirectly the end faces of said annular chamber for the purpose of generating braking forces.

2. A coupling according to claim 1, wherein between said annular piston and one of said parts there are arranged axially effective spring means which axially center said annular piston in said annular chamber.

3. A coupling according to claim 1, wherein one of said end faces of said annular piston and said end faces of said annular chamber are provided with friction linings and are able to contact one another directly.

4. A coupling according to claim 1, wherein between said end faces of said piston and said end faces of said annular chamber there are arranged sets of inner plates and outer plates which, in a rotationally fast and axially movable way, are alternately connected to the one and the other of said parts rotatable relative to one another, and which are able to contact one another directly.

5. A coupling according to claim 4, wherein said inner or outer plates contacting directly said end faces of the annular piston are connected in a rotationally fast way to the same one of said rotatable parts as said annular piston.

6. A coupling according to claim 1, wherein said driving elements consist of longitudinal teeth at the one of said rotatable parts and counter teeth at said annular piston which engage one another with a clearance fit.

7. A coupling according to claim 1, wherein a counter face at the other one of said rotatable parts is provided at a separate, inserted sleeve.

8. A coupling according to claim 1, wherein said cylindrical outer face of said annular piston runs in a contact-free way relative to the cylindrical counter face of the other one of said parts.

9. A coupling according to claim 1, wherein said at least one shear channel extending helically relative to said longitudinal axis is provided in the form of a groove in said annular piston.

10. A coupling according to claim 1, wherein said at least one shear channel extending helically relative to said longitudinal axis is provided in the form of a groove in an inner face of said housing.

11. A coupling according to claim 1, wherein in said annular piston there is provided at least one compensating chamber which is closed by a displaceable compensating piston.

12. A coupling according to claim 1, wherein a hub forms the one of said rotatable parts to which said annular piston is connected and a barrel-shaped housing forms the other one of said rotatable parts which forms said end faces of said annular chamber.

* * * * *